United States Patent
Turányi et al.

(10) Patent No.: US 9,100,983 B2
(45) Date of Patent: Aug. 4, 2015

(54) TELECOMMUNICATIONS METHOD, PROTOCOL AND APPARATUS FOR IMPROVED QUALITY OF SERVICE HANDLING

(75) Inventors: Zoltán Richárd Turányi, Szentendre (HU); György Miklós, Pilisborosjenö (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 175 days.

(21) Appl. No.: 13/512,256

(22) PCT Filed: Nov. 27, 2009

(86) PCT No.: PCT/EP2009/065997
§ 371 (c)(1),
(2), (4) Date: Jul. 17, 2012

(87) PCT Pub. No.: WO2011/063850
PCT Pub. Date: Jun. 3, 2011

(65) Prior Publication Data
US 2013/0121206 A1    May 16, 2013

(51) Int. Cl.
| | | |
|---|---|---|
| H04L 12/28 | (2006.01) |
| H04W 80/04 | (2009.01) |
| H04L 12/911 | (2013.01) |
| H04W 60/00 | (2009.01) |
| H04W 76/02 | (2009.01) |
| H04W 88/00 | (2009.01) |
| H04L 29/06 | (2006.01) |

(52) U.S. Cl.
CPC ............. *H04W 80/04* (2013.01); *H04L 47/782* (2013.01); *H04W 76/025* (2013.01); *H04L 47/745* (2013.01); *H04L 47/822* (2013.01); *H04L 47/824* (2013.01); *H04L 65/80* (2013.01); *H04W 60/005* (2013.01); *H04W 76/022* (2013.01); *H04W 88/005* (2013.01)

(58) Field of Classification Search
None
See application file for complete search history.

(56) References Cited

U.S. PATENT DOCUMENTS

| | | | |
|---|---|---|---|
| 7,839,815 B2 * | 11/2010 | Feder et al. ................ | 370/328 |
| 8,175,056 B2 * | 5/2012 | Suh et al. .................. | 370/331 |
| 2002/0006133 A1 * | 1/2002 | Kakemizu et al. .......... | 370/401 |

(Continued)

FOREIGN PATENT DOCUMENTS

| | | |
|---|---|---|
| CN | 101043644 A | 9/2007 |
| EP | 2015524 A1 | 1/2009 |

(Continued)

OTHER PUBLICATIONS

Johnson et Al. RFC 3775: Mobility Support in IPv6, Jun. 2004.*

(Continued)

*Primary Examiner* — Gregory Sefcheck
*Assistant Examiner* — Jael Ulysse
(74) *Attorney, Agent, or Firm* — Coats & Bennett P.L.L.C.

(57) ABSTRACT

A telecommunications network adapted to process data packets according to the client mobile internet protocol domain is extended to provide bearer capability, such that subsessions can be used to distinguish one portion of traffic from another. A different Quality of Service (QoS) can be assigned to each bearer. The bearers can be setup by a mobile node or a home agent in the telecommunications network.

11 Claims, 10 Drawing Sheets

(56) References Cited

U.S. PATENT DOCUMENTS

| | | | |
|---|---|---|---|
| 2002/0054584 A1* | 5/2002 | Dempo | 370/338 |
| 2004/0133682 A1 | 7/2004 | De Vriendt et al. | |
| 2004/0170156 A1* | 9/2004 | O'Neill | 370/349 |
| 2004/0196797 A1* | 10/2004 | Lee et al. | 370/313 |
| 2005/0053034 A1* | 3/2005 | Chiueh | 370/331 |
| 2006/0109829 A1* | 5/2006 | O'Neill | 370/338 |
| 2006/0153124 A1* | 7/2006 | Kant et al. | 370/328 |
| 2006/0215599 A1 | 9/2006 | Nakatugawa et al. | |
| 2006/0274672 A1* | 12/2006 | Venkitaraman et al. | 370/254 |
| 2007/0147320 A1* | 6/2007 | Sattari et al. | 370/338 |
| 2008/0153454 A1* | 6/2008 | Haapapuro et al. | 455/404.1 |
| 2008/0256220 A1* | 10/2008 | Bachmann et al. | 709/222 |
| 2008/0310323 A1* | 12/2008 | Shirota et al. | 370/328 |
| 2008/0310334 A1* | 12/2008 | Nakamura et al. | 370/310 |
| 2009/0238099 A1* | 9/2009 | Ahmavaara | 370/254 |
| 2009/0300207 A1* | 12/2009 | Giaretta et al. | 709/232 |
| 2010/0020748 A1* | 1/2010 | Tazaki | 370/328 |
| 2010/0039936 A1* | 2/2010 | Jin et al. | 370/230 |
| 2010/0046512 A1* | 2/2010 | Xia et al. | 370/389 |
| 2011/0063997 A1* | 3/2011 | Gras et al. | 370/254 |

FOREIGN PATENT DOCUMENTS

| | | |
|---|---|---|
| JP | 2002152277 A | 5/2002 |
| JP | 2006262017 A | 9/2006 |
| JP | 2008311974 A | 12/2008 |

OTHER PUBLICATIONS

Johnson et al. RFC 3775 IP Mobility Support for IPv6 hereafter Johnson.*

Kim, K. et al., "Domain Based Approach for QoS Provisioning in Mobile IP", Global Telecommunications Conference, Nov. 29, 2001, pp. 2230-2234, IEEE Globecom '01, vol. 4.

Karagiannis, G. "QoS in GPRS." [online] Dec. 21, 2000 [retrieved on Aug. 2, 2010]. Retrieved from the Internet: <URL:http://doc.utwente.nl/18117/1/00000039.pdf>.

Murthy, K. "NextGen Wireless Access Gateway Analysis of Combining WiMAX and LTE Gateway Functions." 2nd International Conference on Internet Multimedia Services Architecture and Applications (IMSAA 2008), Dec. 10-12, 2008, pp. 1-6.

Defense Advanced Research Projects Agency: "Internet Protocol." RFC 791, Sep. 1981, DARPA Internet Program, Protocol Specification.

Perkins, C. et al. "IP Mobility Support for IPv4." RFC 3344, Internet Engineering Task Force (IETF) Standards Track, Aug. 2002, pp. 1-99.

Yegani, P. et al. "GRE Key Extension for Mobile IPv4 draft-yegani-gre-key-extension-04.txt". Internet Engineering Task Force (IETF) Standards Track, Jul. 28, 2009, pp. 1-9.

Hemant Chaskar et al "A Framework for QoS Support in Mobile IPv6 draft-chaskar-mobileop-pos-01.txt." IETF Mobile IP Working Group, Internet-Draft, XP015011644 Mar. 2001; pp. 1-11.

* cited by examiner

TELECOMMUNICATIONS METHOD, PROTOCOL AND APPARATUS FOR IMPROVED QUALITY OF SERVICE HANDLING

TECHNICAL FIELD

The present invention relates to a telecommunications method, protocol and apparatus, and in particular to a method, protocol and apparatus relating to an improved mobile internet protocol (MIP).

BACKGROUND

There exist a number of different mobility protocols employed in Release 8 of the 3rd Generation Partnership Project (3GPP) core network. Mobility management in such a telecommunications network generally falls into two categories, one being host-based mobility management and the other being network-based mobility management.

An example of host-based mobility management is Mobile Internet Protocol (MIP, or Mobile IPv6). Mobile IP allows location-independent routing of IP packets on a data network, such as the Internet. Each mobile device (i.e. mobile node) is identified by its home address disregarding its current location in the Internet. While away from its home network, a mobile node is associated with a care-of address which identifies its current location, and its home address is associated with the local endpoint via a tunnel to its home agent (see definition below). Mobile IP specifies how a mobile node registers with its home agent and how the home agent routes packets to the mobile node through the tunnel.

FIG. 1 shows a basic overview of a Mobile IP network, having a home network 1 and a foreign network 3. The home network 1 of a mobile node 5 is the network within which the mobile node 5 receives its identifying IP address (known as the home address). The home address of a mobile node 5 is the IP address assigned to the mobile node 5 within its home network 1. A foreign network 3 is the network in which a mobile node 5 is operating when away from its home network 1 (as shown in FIG. 1).

The care-of address of a mobile node 5 is the physical IP address of the node when operating in the foreign network 3. A Home Agent (HA) 7 is a router in the home network 1 of a mobile node 5, which tunnels packets for delivery to the mobile node 5 when it is away from its home network 1. The HA 7 maintains current location information (IP address information) for the mobile node 5, and is used with one or more Access Routers (ARs) 9. An AR 9 is a router that stores information about mobile nodes 5 visiting the associated foreign network 3. ARs 9 also advertise care-of-addresses which are used by Mobile IP. The association of the home address with a care-of address is called a "binding". The HA 7 routes packets to the AR 9 via a tunnel 11, the AR 9 in turn forwarding packets to the mobile node 5.

In contrast to host-based mobility management, an example of network-based mobility management is the GPRS Tunneling Protocol (GTP). Another example of network-based mobility management is Proxy Mobile IP (PMIP, or Proxy Mobile IPv6), which is a new standard being developed by the Internet Engineering Task Force (IETF).

To help explain these network-based mobility management protocols further, reference will now be made to FIG. 2 which shows a more detailed overview of an exemplary telecommunications network, known as the E-UTRAN (Evolved UMTS terrestrial radio access network) which uses the Long Term Evolution (LTE) standard. The network comprises a plurality of radio base stations (also known as eNodeBs, Node Bs, etc) 21*a*, 21*b*, 21*c*, each of which maintains one or more cells (not illustrated). User Equipment ("UE", i.e. mobile equipment or mobile nodes) 23*a*, 23*b*, 23*c*, 23*d* within each cell communicate with the corresponding eNodeB 21 of that cell.

In the E-UTRAN, eNodeBs 21 are capable of communicating with one another over interfaces known as X2 interfaces (illustrated as dashed lines in FIG. 2). Each eNodeB 21 further has one or more interfaces with the core network. These are known as S1 interfaces. In particular, the eNodeBs 21 have one or more S1 interfaces to one or more mobility management entities (MMEs) 25*a*, 25*b*, which will be described in more detail below.

The telecommunications network also comprises a Serving Gateway (SGW) 29. The Serving Gateway 29 is connected to an eNodeB 21*a* via an S1u interface, and an MME 25*a* via an S11 interface. It will be appreciated that a Serving Gateway 29 may be connected to one or more of each of said devices, plus other nodes such as Serving GPRS Support nodes (SG-SNs, not shown). A Serving Gateway 29 is adapted to perform, amongst other things, the routing and forwarding of user data packets, while also acting as the mobility anchor for the user plane during inter eNodeB handovers (for example as a UE 23*a* is handed over from eNodeB 21*a* to eNodeB 21*c*). The Serving Gateway 29 also acts as the anchor for mobility between LTE and other 3GPP technologies. It also manages and stores UE contexts, for example parameters of the IP bearer service, and network internal routing information.

The Serving Gateway 29 is connected to a Packet Data Network Gateway (PDN GW) 31 via an S5 interface. The PDN GW 31 provides connectivity to the UE to external packet data networks, such as the internet 33, by being the point of exit and entry of traffic for the UE.

The MME 25*a* is responsible, amongst other things, for idle mode UE tracking and paging procedures. It is also involved in a bearer activation/deactivation process and is also responsible for choosing the initial Serving Gateway (SGW) for a UE.

As mentioned above, a PDN GW 31 provides connectivity (via an SGi interface) from the UE 23 to external packet data networks 33 (for example the internet) by being the point of exit and entry of traffic for the UE 23. A UE 23 may have simultaneous connectivity with more than one PDN GW 31 for accessing multiple PDNs 33. The PDN GW 31 performs, amongst other things, policy enforcement, packet filtering for each user, charging support, lawful Interception and packet screening. Another key role of the PDN GW 31 is to act as the anchor for mobility between 3GPP and non-3GPP technologies, via S2 interfaces (not shown).

Mobility management in a Proxy Mobile IP system defines two network entities which are involved in the process, a Local Mobility Anchor (LMA) and the Mobile Access Gateway (MAG), as defined by the Proxy Mobile IP protocol RFC 5213. When applied to the S5 interface of the 3GPP architecture of FIG. 2, the SGW 29 acts as a MAG while the PDN GW 31 acts as a LMA. The MAG is a function on an access router that manages the mobility related signalling for a mobile host that is attached to its access link. LMA is the home agent for the mobile host in a Proxy Mobile IP domain. The protocol works as follows:

- A mobile host enters a PMIP domain
- A Mobile Access Gateway on that link checks host authorization
- A mobile host obtains an IP address
- A Mobile Access Gateway updates a Local Mobility Anchor about the current location of a host Both MAG and LMA create a bi-directional tunnel.

Network-based mobility management offered by GTP and PMIP provide similar functionality to that of Mobile IP. However, network-based mobility management does not require any modifications to the network stack of the mobile host. In other words, the mobility is taken care of, as the name suggests, by the network.

A key functional difference between GTP and PMIP, however, is that the former also supports the establishment of sub-sessions within a mobility session, known as "bearers", (or "PDP contexts" in older versions of the 3GPP standard). Bearers enable Quality-of-Service (QoS) differentiation to be provided by using centralized traffic classification. As a consequence, downlink packets need to be classified and assigned to a particular QoS class (known as "mapping to a bearer" in the 3GPP standard) only in an anchor point (for example, in a PDN Gateway 31 as shown in FIG. 2). Bearers can be thought of as L2 channels between a UE 23 and the first-hop router (i.e. PDN GW 31) with different QoS properties. When a new bearer is set up the PDN GW 31 and the UE agree on which IP micro-flows (i.e. Service Data Flows, SDFs, as explained further below), identified by a 5-tuple, are placed on the new bearer. Thus all packets sent by the PDN GW 31 to the UE (or vice versa) are classified to see which bearer(s) the packets should be placed on. This classification is carried out by looking through these 5-tuple values and comparing them to the header fields in the packet. Later elements on the path of the packet (for example the SGW 29, eNodeB 21) do not have to classify again, since they already know which bearer the packet is on and consequently what QoS to apply.

FIG. 3 shows the relationship between Service Data Flows (SDFs) and bearers in a LTE telecommunications network. A service data flow is a set of IP packets matching a certain 5-tuple filterset. In other words, a SDF is a portion of the traffic, while a bearer is a transmission facility. The SDFs are placed onto (or transmitted through or via) bearers. A bearer is itself a virtual connection having an unique Quality-of-Service (QoS) class.

In FIG. 3 a first bearer 301 having a first QoS class (QoS1) is shown as carrying a plurality of Service Data Flows $SDF_{11}$ to $SDF_{1N}$, while a second bearer 303 having a second QoS class (QoS2) is shown as carrying a plurality of Service Data Flows $SDF_{21}$ to $SDF_{2}N$. In the network of FIG. 2, a bearer on a data path between a UE 23 and a PDN Gateway 31 will have three segments:

a radio bearer between an UE 23a and an eNodeB 21a, a data bearer between the eNodeB 21a and the SGW 29, the S1u bearer, and a data bearer between the SWG 29 and the PDN GW 31, the S5 bearer.

Since a packet is classified and assigned to a particular QoS class, the packet is then marked accordingly. In particular, the bearer is identified by a Tunnel Endpoint Identifier (TEID), which tells the result of the classification to all subsequent nodes in the network (as described above). The TEID is used to identify which bearer the packet travels on only over the S1u and S5 interfaces, where the GTP protocol is used to carry packets. Different fields/mechanisms (i.e. radio related identifiers) are used over the air interface, where GTP is not used to carry packets.

For uplink packets, the mobile node performs classification and bearer mapping, and all subsequent nodes can rely on this classification (with one node actually verifying it), for the purpose of network control.

It is noted, however, that the PMIP based solution does not comprise bearer capability (i.e. cannot establish bearers), and instead requires packet classification to be carried out both in the PDN GW 31 and in a Serving Gateway 29. To achieve packet classification, a Policy and Charging Rules Function (PCRF) must download the classification rules to the Serving Gateway 29 (i.e. in addition to the PDN GW 31 shown in FIG. 2). Furthermore, the policy rules must also be downloaded to a new Serving Gateway following a change of Serving Gateway, for example due to a handover. This has the disadvantage of resulting in excessive policy related signaling and makes the policy system mobility-aware.

Currently, Mobile Internet Protocol (MIP), also known as Client Mobile Internet Protocol (CMIP), is the only host-based mobility protocol considered for general use for non-3GPP accesses. Similar to PMIP, it lacks bearer capabilities, and therefore has the disadvantage of requiring flow classification in the gateway of the non-3GPP access. In other words, a control node must look into a CMIP tunnel for the purpose of flow classification. However, this is not possible if the CMIP tunnel is encrypted.

SUMMARY

It is an aim of the present invention to provide a method and a Mobile Internet Protocol (or Client Mobile Internet Protocol) for a telecommunications network, and an apparatus adapted to perform such a communications protocol and method, that does not suffer from one or more of the disadvantages mentioned above.

In particular, it is an aim of the present invention to provide a Mobile Internet Protocol (or Client Mobile Internet Protocol) in which host-based mobility management comprises bearer support.

According to a first aspect of the invention, there is provided a method in a host-based mobility managed telecommunications network adapted to process traffic using a mobile internet protocol (MIP). The method comprises the steps of providing one or more bearers for transporting data packets within a mobility session, the one or more bearers enabling sub-sessions to be created within the mobility session.

The method may comprise the step of associating a key value with each bearer.

The key value may represent a quality of service (QoS) of a data packet being transported by the associated bearer The method may also comprise the step of associating an outer header with each bearer, the outer header being used to route the data packet on an user plane. This has the advantage of enabling packets to be operated upon even when the underlying data packet is encrypted.

The setting up of a bearer may be performed using a binding update and/or binding acknowledgement message of the mobile internet protocol. A bearer may be set up by a mobile node or by a home agent in the telecommunications network.

First and second bearers of a plurality of bearers enable a first portion of traffic of a given mobile node to be distinguished from a second portion of traffic of that given mobile node.

The method may also comprise the step of providing a set of IP flow filters, wherein an IP flow filter in the set of IP flow filters is configured to match data packets with a corresponding bearer.

A default bearer may be provided, wherein the default bearer is configured to carry packets that have not been matched by any of the IP flow filers.

The method may also comprise the step of associating a descriptor field with each bearer, the descriptor field describing how packets in the bearer are to be treated at other nodes in the network.

A key value may be attributed to each packet using generic route encapsulation (GRE).

According to another aspect of the invention, there is provided a method in a mobile node of a host-based mobility managed telecommunications network adapted to perform mobile internet protocol. The method comprises the steps of: sending a binding request message to a second node, the binding request message comprising one or more downlink key values associated with one or more bearers being requested by the mobile node; and receiving a binding acknowledgement message from the second node, the binding acknowledgement message comprising one or more uplink key values associated with the one or more bearers, respectively.

According to another aspect of the invention, there is provided a mobile node adapted to perform the above method.

According to another aspect of the invention, there is provided a method in a home agent node of a host-based mobility managed telecommunications network adapted to support mobile internet protocol. The method comprises the steps of: sending a bearer setup message to a second node, the bearer setup message comprising one or more uplink key values associated with the one or more bearers being requested by the home agent node; and receiving a bearer setup acknowledgement message from the second node, the bearer setup acknowledgement message comprising one or more downlink key values associated with the one or more bearers.

According to another aspect of the invention, there is provided a method in a home agent node of a host-based mobility managed telecommunications network adapted to perform mobile internet protocol, characterised in that the method comprises the steps of: receiving a binding request message from the second node, the binding request message comprising one or more downlink key values associated with one or more bearers being requested by the second node; and sending a binding acknowledgement message to the second node, the binding acknowledgement message comprising one or more uplink key values associated with the one or more bearers, respectively.

According to another aspect of the invention, there is provided a home agent node adapted to perform the method of the above two paragraphs.

According to another aspect of the invention, there is provided a method in an access router node of a host-based mobility managed telecommunications network adapted to perform mobile internet protocol, characterised in that the method comprises the steps of: configuring a quality of service function for one or more bearers; and applying the quality of service function to packets passing through the access router.

According to another aspect of the invention, there is provided an access router adapted to perform the above method.

BRIEF DESCRIPTION OF THE DRAWINGS

For a better understanding of the present invention, and to show more clearly how it may be carried into effect, reference will now be made, by way of example only, to the following drawings in which.

DETAILED DESCRIPTION

The embodiments below will be described in relation to the Mobile Internet Protocol (MIP) domain, otherwise known as Client Mobile Internet Protocol (CMIP).

According to the invention, a host-based mobility management system, such as a CMIP system, is extended to provide bearer support. The bearers enable sub-session to be provided within a given mobility session. Each bearer is assigned a key value, the key value representing, for example, a Quality-of-Service (QoS) associated with the data packets being transported therewith. The bearers are setup end-to-end between a Home Agent and a Mobile Node using extensions of the existing Mobile IP standard, for example an extension to the MIPv6 standard.

As such, the bearers of the present invention enable portions of traffic of a single mobile node to be separated from other portions of traffic of the same mobile node. In other words, the bearers enable differentiation within the traffic of a mobile node, for example based on Quality of Service QoS.

Figure 1:
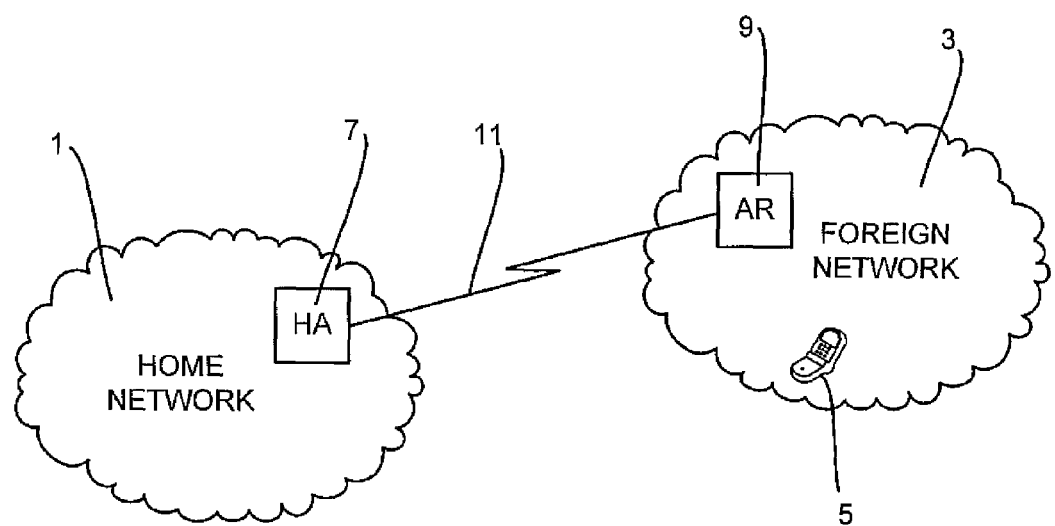
FIG. 1 shows a basic overview of a Mobile IP network.
Figure 2:
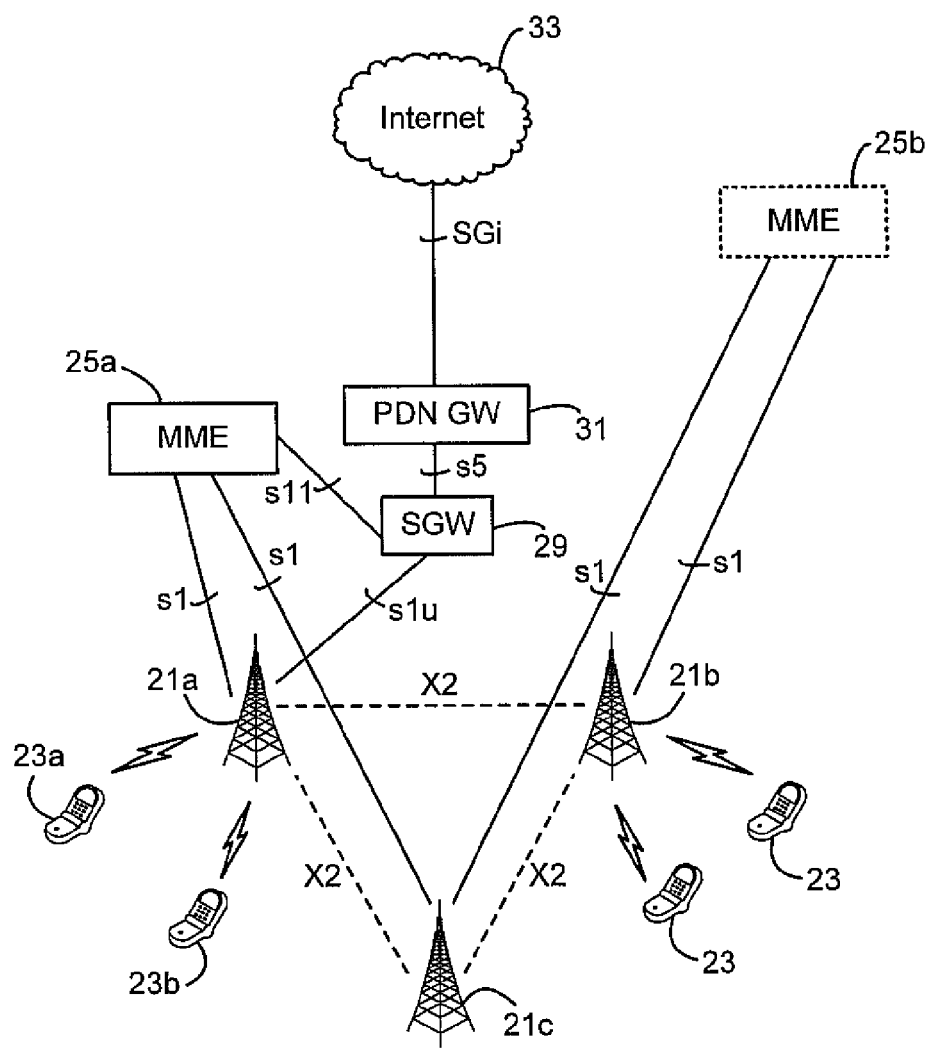
FIG. 2 shows an overview of a telecommunications network using the Long Term Evolution (LTE) standard.
Figure 3:
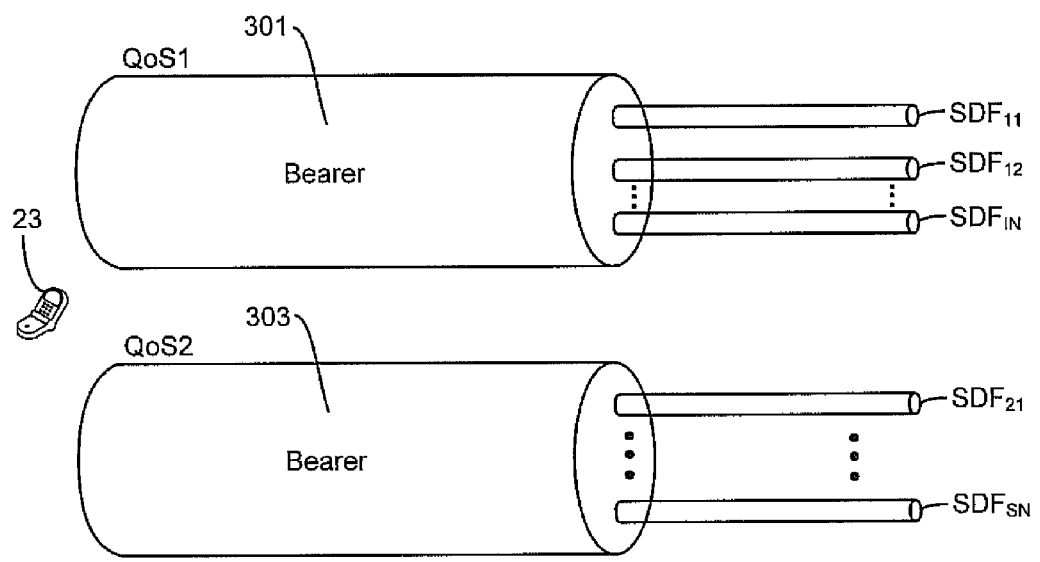
FIG. 3 shows the relationship between bearers and Service Data Flows (SDFs) in a network-based mobility management domain.
Figure 4:
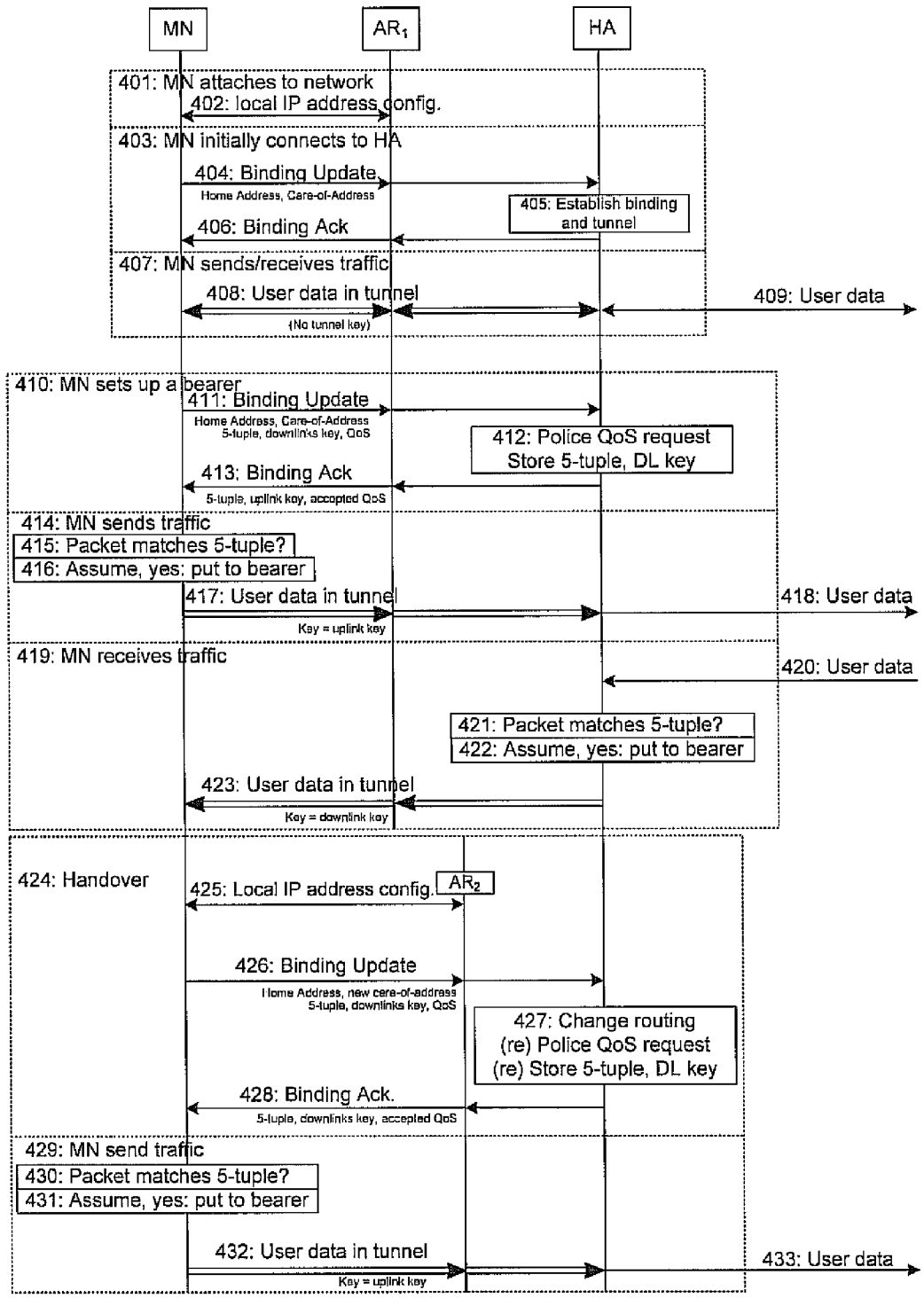
FIG. 4 shows a flow diagram according to one embodiment of the present invention.

FIG. 4 shows a message flow to help illustrate the invention further, showing various stages and steps. The stages and steps shown in 401 to 409 illustrate how a Mobile Node (MN) establishes a binding, and sets up a tunnel with a Home Agent (HA). It is noted that the various stages and steps 401 to 409 are standard stages and steps according to existing CMIP procedures.

The stages and steps shown in 410 to 423 describe how a bearer is set up in accordance with the present invention, while the stages and steps shown in 424 to 433 describe how a handover is performed.

During the setup of a bearer, stage 410, a key value is negotiated and an IP flow filter describes packets that are transported on a given bearer. In essence, each endpoint informs the other about the key value it wants to receive for this bearer. For example, in step 411 the MN sends the HA a Binding Update message, which informs the HA (amongst other things) of the downlink key that is to be used by the HA in downlink packets. Likewise, in step 413 the HA sends the MN a Binding Acknowledgement message, which informs the MN, amongst other things, of the uplink key that is to be used by the MN in uplink packets. Each key value corresponds, for example, to a QoS descriptor. The QoS descriptor is only used in the signalling (denoted as "QoS" in messages 411-413 and 426-428). It is noted that the key value can be any QoS descriptor. For example in the 3GPP context the key value may be Class Identifier (QCI), Allocation and Retention Policy (ARP), Maximum Bit Rate (MBR) or Guaranteed Bit Rate (GBR) values.

During a handover stage 424, in step 426 the MN sends a Binding Update message to the HA which includes a full list of bearers. In the example of FIG. 4 it is noted that, for ease of reference, only one bearer is shown as being setup, and as such the "full list" is for one item only, repeated in message 426. It will be appreciated however that, if there were multiple bearers, then there would be multiple (5-tuple, downlink key, QoS) values listed. Furthermore, it is noted that, in practice, 5-tuple may mean a list of 5-tuples if there are multiple microflows (i.e. SDFs) in a bearer (i.e. sub-session). It will also be appreciated that mechanisms other than 5-tuple may be used without departing from the scope of the invention.

Including a full list of bearers in the Binding Uplink messages enables a new access to setup QoS when a mobile node arrives and sets up a binding there.

According to a first arrangement an Access Router ($AR_1$) can snoop or monitor Binding Update and Binding Acknowledgement (BU/BA) messages and learn which bearers are established, and determine the QoS and the associated keys. Then, the $AR_1$ can provide the QoS to all packets that travel in tunnels marked with those (uplink or downlink) keys.

According to a second arrangement, whereby a proxy is provided in the path of MIP signalling (i.e. when the MN sends its Binding Update messages not to the HA, but to a proxy such as $AR_1$), then in such an arrangement the $AR_1$ is configured to learn the bearers by inspecting the messages it proxies.

According to a third arrangement, a policy and charging server (for example a Policy and Charging Rules Function, PCRF) is adapted to explicitly configure the $AR_1$ with the QoS, as will be explained later in the application. This involves negotiating QoS provisions between the $AR_1$ and PCRF.

Tunneling is used in the user plane, for example Generic Routing Encapsulation (GRE) tunneling, to tunnel the packets which can carry a key value for each packet. That key value identifies which bearer the packet belongs to. If the packet payload is encrypted, the GRE tunnel shall not be encrypted, so that the bearer can actually be deduced by an intermediate node (the $AR_1$ in FIG. 4, i.e. a "middlebox").

As mentioned above, an intermediate node can snoop passing MIP signalling and learn about the bearers. Thus, if a "proxy" (i.e. $AR_1$) is inserted into the path of signalling (as an extension of CMIP) the intermediate node can, in addition, police and change bearer requests. When setting up a bearer, the MN effectively requests resources from the network. It effectively requests "I want these microflows to have these (good) QoS properties up to this bandwidth." This may effectively result in reserving bandwidth and providing low delay to these packets. The policing of these requests is the action of the network, i.e. checking if this user is entitled to such requests and resources. Charging involves the setup of counters that count how long the user has the resources and/or how much traffic it has sent in this bearer, so a charging system can later change these counters to monetary value.

Figure 5:
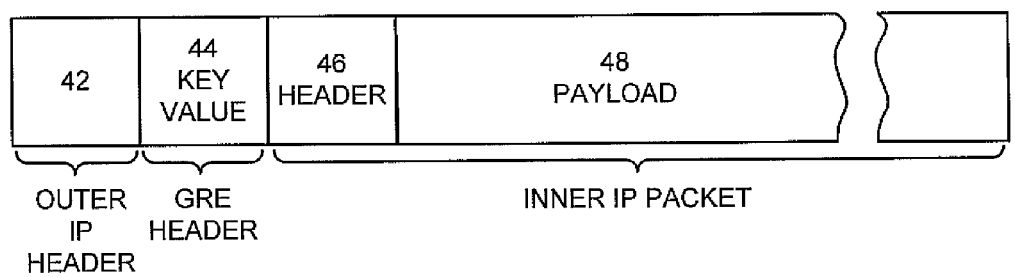
FIG. 5 shows a bearer according to the present invention.

FIG. 5 shows the construction of a packet formatted to be transmitted on a bearer according to the present invention.

A packet formatted for transmission on a bearer is defined by the following features:
- an outer IP header 42;
- a GRE Header 44, including a key value and
- an inner IP packet, including a header 46 and payload 48 combined.

The key value contained in the GRE Header 44, as mentioned above, indicates the Quality-of-Service class assigned to that particular packet payload on that particular bearer. The outer IP header 42 is used in the user plane for routing packets. It will be appreaciated from the above that, even if the inner IP packet (i.e. comprising the header 46 and payload 48) is encrypted, a node is still able to snoop or monitor the outer IP header 42 and the GRE header 44 that includes the key value. As such, a node is able to apply Qos to the packet without having to decrypt the packet.

QoS descriptors are exchanged between the MN and HA during bearer setup. As part of this process the Access Router also learns them (for example according to one of the three separate arrangements described above). Afterwards, the descriptors are not communicated any more, but stored in these three nodes. It is noted, however, that an exception takes place during handover, when all QoS descriptors are re-sent.

It will be appreciated that individual packets do not carry the descriptors. Instead, a key value is associated with the packet, which is used as a reference to a previously exchanged QoS descriptor.

A set of IP flow filters match packets that are to be assigned to a particular bearer. Flow filters are lists of 5-tuple values each consisting: IP source address, IP destination address, source port, destination port, protocol (e.g., TCP or UDP). These are installed in the MN and HA using the Binding Update signalling during bearer setup. The intermediate nodes do not necessarily require IP flow filters. Furthermore, user plane packets do not contain IP flow filters either. When packets are sent by the HA or MN to the other, the packet is checked against the flow filters to find which bearer the packet should be placed in. Then, the key of that bearer is placed into the GRE header (uplink if sent by the MN, downlink if sent by the HA).

A descriptor field describes how packets in a particular bearer should be treated at other nodes in the network. For example, for a 3GPP system this may comprise one or more values relating to QoS Class Identifier (QCI), Allocation and Retention Policy (ARP), Maximum Bit Rate (MBR) or Guaranteed Bit Rate (GBR).

A QCI is a scalar that is used as a reference to access node-specific parameters that control bearer level packet forwarding treatment (for example scheduling weights, admission thresholds, queue management thresholds, link layer protocol configuration, etc), and that have been pre-configured by the operator owning the access node (for example an eNodeB 21).

The GBR denotes the bit rate that can be expected to be provided by a GBR bearer. The MBR limits the bit rate that can be expected to be provided by a GBR bearer (for example, excess traffic may get disregarded by a rate shaping function).

The APR may contain information about the priority level (scalar), and pre-emption capability and vulnerability flags. The main purpose of the ARP is to decide whether a bearer establishment/modification request can be accepted, or needs to be rejected in case of resource limitations. The priority level information of the ARP is used for this decision to ensure that the request of the bearer with the higher priority level is preferred. Furthermore, the ARP may be used (for example by eNodeBs) to decide which bearer(s) to drop during exceptional resource limitations, for example during handover. The pre-emption capability information of the ARP defines whether a bearer with a lower ARP priority level should be dropped to free up the required resources. The pre-emption vulnerability information of the ARP defines whether a bearer is applicable for such dropping by a pre-emption capable bearer with a higher ARP priority value. Once successfully established, a bearer's ARP shall not have any impact on the bearer level packet forwarding treatment (such as scheduling and rate control). In other words, the packet forwarding treatment should preferably be determined using the other values of the descriptor field, namely the QCI, GBR and MBR.

The bearers exist within a CMIP binding, i.e. within the binding of one Home Address (HoA) and one Care-of Address (CoA). In the HA each HoA has a registered CoA and this is a binding. Each binding corresponds to one MN. Each MN may have zero, one or more bearers.

According to one embodiment, one of the bearers may be denoted as the default bearer. The provision of a default bearer enables all of the packets that have not been matched by any of the IP flow filters to be transported. The mobile node or the Home Address may specify packet treatment even for such packets, in that case the MN shall specify the IP flow filter with a prefix length of zero for addresses, and wildcard for all other fields.

Figure 6:
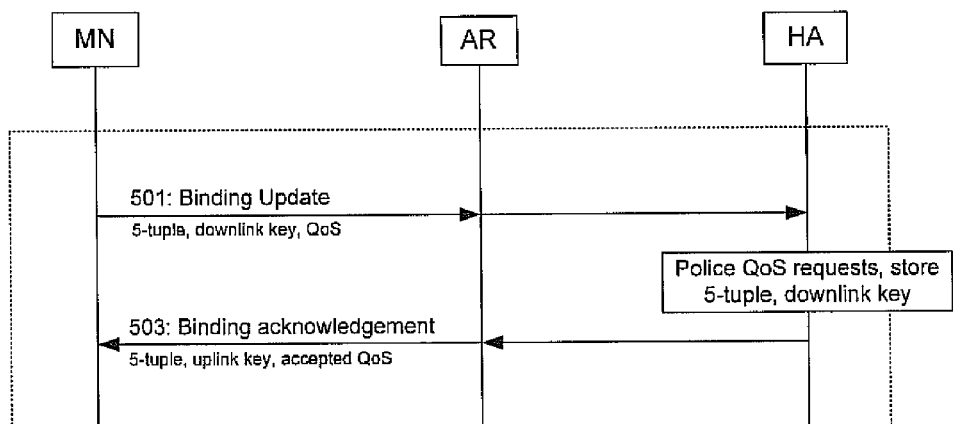
FIG. 6 shows the steps performed during the establishment, modification or deletion of bearers by a mobile node.

FIG. 6 is a simplified flow diagram disclosing the steps performed during the establishment by a mobile node MN of a bearer. These correspond to steps 411 to 413 of FIG. 4, and will be described in greater detail below. It is noted that similar message flows can also be used for modification or deletion of bearers.

If an MN wishes to establish a new bearer, modify an existing one or delete one, it sends a new Binding Update in step 501 to a HA. In one embodiment, the MN lists the requested bearers with their parameters in the Binding Update message 501. The parameters in the Binding Update message specify the flow filter (5-tuple), the downlink key it desires and the QoS of the flow. The Binding Update message may also contain other information, such as the Home Address or Care-of-Address. The HA responds by sending a Binding Acknowledgement message in step 503 with its requested uplink key and repeats the 5-tuple, so that the MN knows which bearer the response corresponds to.

The HA can police bearer parameters, and returns the accepted list of bearers in the Binding Acknowledgement message 503. The HA may decide that the level of requested QoS is too high (e.g., low quality subscription) and downgrade the QoS. This can be denoted as an "accepted QoS" message in the Binding Acknowledgement of step 503. For bearers rejected or modified, the Binding Acknowledgement message may also contain error codes as explanations for the change or omission.

It will be appreciated that the establishing of bearers by an MN, as described above, can also apply to the establishment of bearers by a HA.

Thus, if a HA wishes to establish bearers, it can do so by sending a suitably defined new mobility message with the updated list of bearers to the MN.

Figure 7:
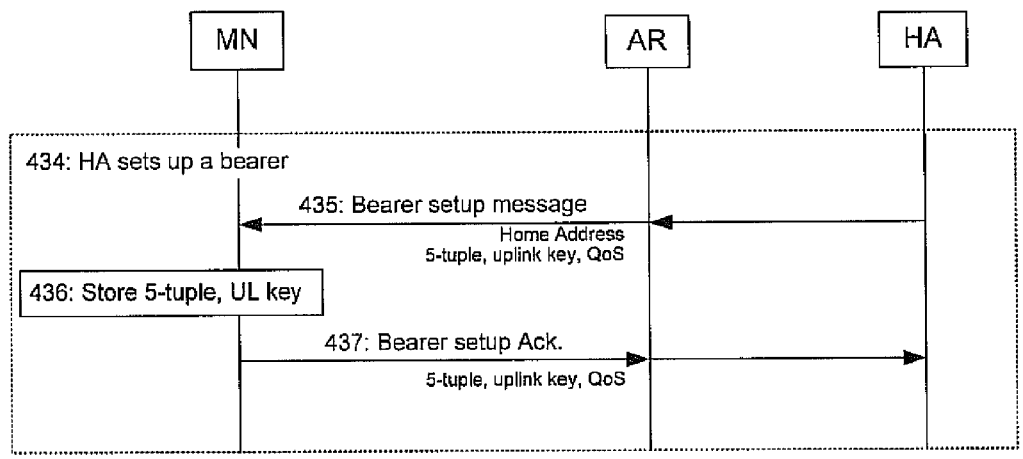
FIG. 7 shows the steps performed during the establishment, modification or deletion of bearers by a home agent.

FIG. 7 shows a flow diagram of a HA setting up such a bearer. This is a new type of message introduced by the invention (Bearer setup), because in MIP only an MN can start messaging. It will be appreciated, however, that this is just one example of how to set up a bearer. Alternatively, any other message type could be reused. In step 435 the HA sends this "Bearer setup message" to the MN specifying the flow filter (5-tuple), the uplink key it desires and the QoS of the flow. The MN responds in step 437 with its requested downlink key and repeats the 5-tuple, so that the HA knows which bearer the response corresponds to.

Thus, it is possible for both the MN and HA to initiate the establishment of a bearer. The latter is useful when a particular network node wants to provide QoS to a particular portion of traffic without the MN being aware of it. For example, if a user is watching an online video, the web server sending the user the data can request the HA to provide the user with bandwidth reservation, so the video never re-buffers. This can be done by the web server sending a message to the HA with the requested QoS and the 5-tuple of the flow carrying the video. The HA can then set up QoS, such that the user terminal of the user does not really have to do anything (other than acknowledging the message, which is usually done by the kernel and not by the browser, such that the application developers can be unaware of this). It is possible for bearers established by a HA to co-exist side-by-side with bearers established by an MN.

As mentioned above in relation to FIG. 4, during a handover procedure when a MN moves from one base station to another, a Binding Update message sent from a MN to a HA shall contain all the bearers.

A Binding Update message without the newly defined extensions, i.e. without the information elements in the MIP messages that carry the description of the bearer parameters (such as the key value to be used in uplink/downlink packets, QoS descriptor of the bearers, and IP filters of the SDFs to be transmitted on the bearer) removes all bearers, except the default one. This is because the semantics of a conventional Binding Update message in CMIP (i.e. without any bearers as provided by the present invention) enables a best-effort tunnel to be setup. Thus, even with these extensions the invention keeps these semantics. This enables good backwards compatibility with existing systems.

Figure 8:
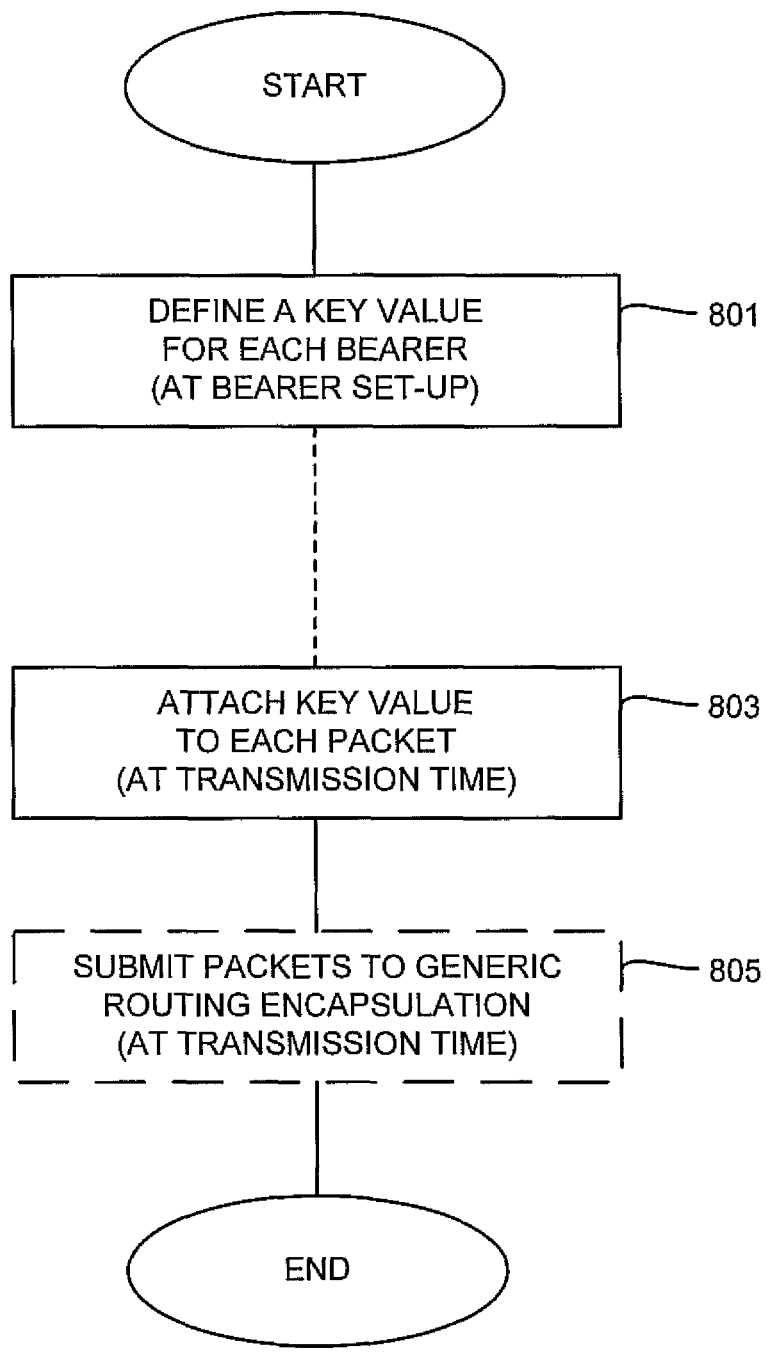
FIG. 8 shows the steps performed by a mobile node or a home agent.

FIG. 8 describes the behavior on the user plane. During bearer setup a key value is specified for each bearer, step 801. Subsequently, during packet transmission, the specified key value is attached to each data packet that is to be transported in that particular bearer, step 803. One technique for attaching the key value to each data packet, as mentioned above, is to use Generic Routing Encapsulation (GRE), step 805. Packets arriving at a node using encapsulation without a key value, shall be treated as if arrived on the default bearer. This enables good backwards compatibility, as packets sent with IP-in-IP encapsulation will travel on the default bearer. It also enables reduced overhead for default packets.

Figure 9:
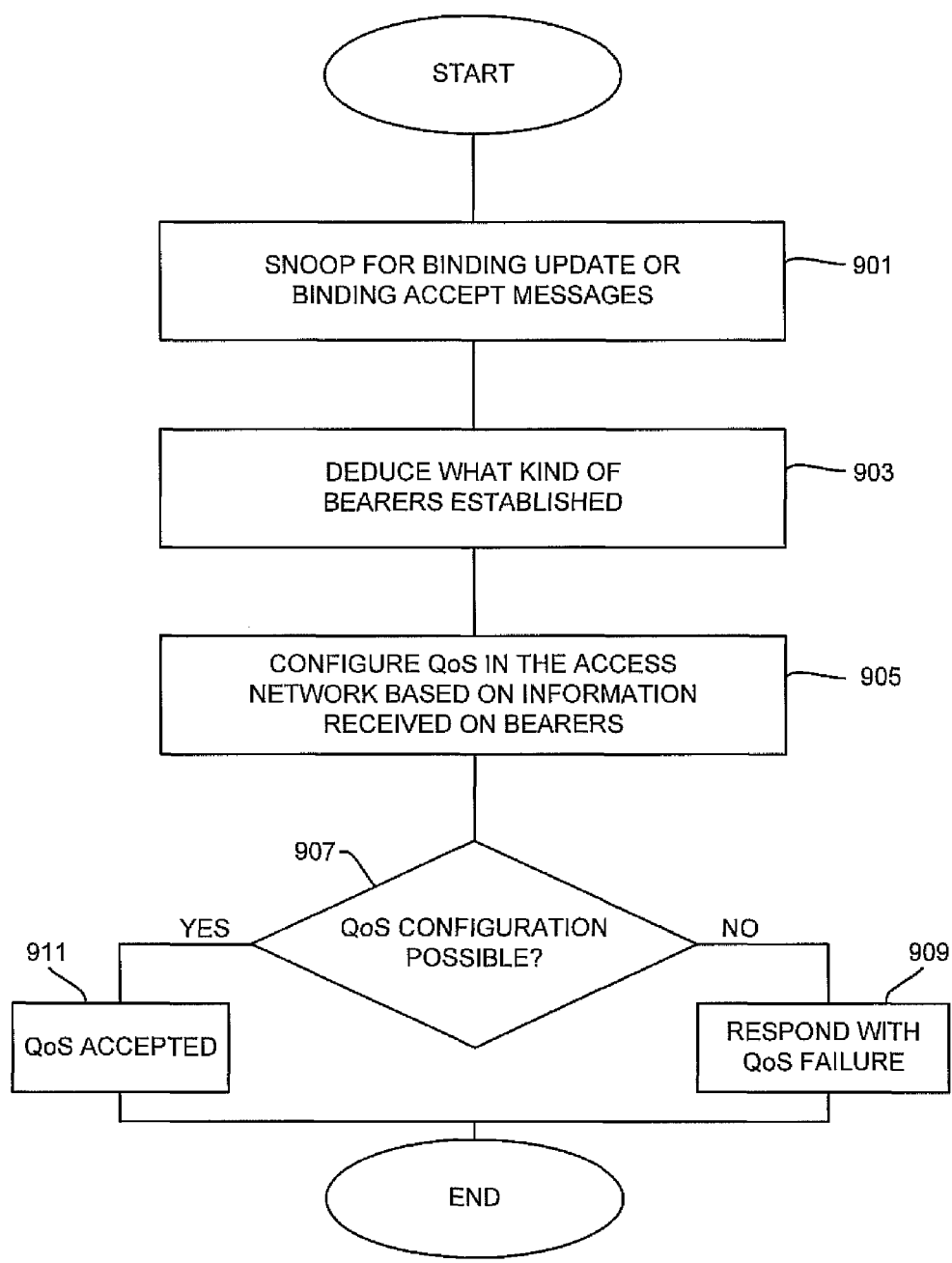
FIG. 9 shows the steps performed by an intermediate node.

FIG. 9 describes the basic steps performed at a middlebox (i.e. an intermediate or transparent node AR). Middleboxes, such as the gateways (GWs) of non-3GPP access networks can snoop or monitor for Binding Update/Binding Accept messages, step 901. Based on such snooping the gateways can deduce what kind of bearers are established, step 903. Multiple bearers can be established if there is a need to have multiple types of QoS. For example, one bearer can be opened for voice and another for video in the case of a video/telephony call. Both require special QoS, but not the same (for example voice can loose some packets, whereas video cannot).

Next, in step 905, the information received on the bearers enables Quality of Service to be configured in the access network. This may be carried out in a middlebox, or other nodes depending on the particular application. For example, in the case of snooping on a MIP proxy (such as the $AR_1$ shown in FIG. 4, the middlebox configures QoS by itself. In the case where a policy and charging server (PCRF) explicitly configures the AR with the QoS, this is done by the PCRF. If it is determined in step 907 that such QoS configuration has failed, the middlebox can respond with an ICMP message or a mobility message to the initiator of the bearer setup, step 909, to inform it about the QoS failure. If it is determined in step 907 that such QoS configuration is possible, the middelbox treats the QoS as accepted, step 911, and subsequently applies that QoS to all packets that travel in tunnels marked with those (uplink or downlink) keys.

It is assumed above that the middlebox communicates with the mobile node using a secure channel and that the Binding Update messages are not encrypted. In the case of the first and second arrangements described earlier in the application, if the Binding Update is encrypted, the middlebox (i.e. $AR_1$ in FIG. 4) cannot learn the parameters of the bearers (because it cannot decrypt the Binding Uplink). As such, it would not be able to configure QoS, and as such the concept of having bearers would not work.

In the embodiments described above, it will have been noted that the Access Routers (ARs), where used, provide a proxy mechanism for MIPv6. The ARs can advertise such proxy capability to hosts in a manner similar to how MIPv4 Foreign Agents operate. Then, mobile nodes can send the Binding Update messages to these MIP proxies located in the Access Routers, which, in turn send the Binding Update messages to the Home Agent.

In the presence of such a proxy mechanism, the proxy can reliably read and modify and respond to bearer modification requests. CMIP++ Mobile Node Proxy mechanism is one such mechanism.

Figure 10:
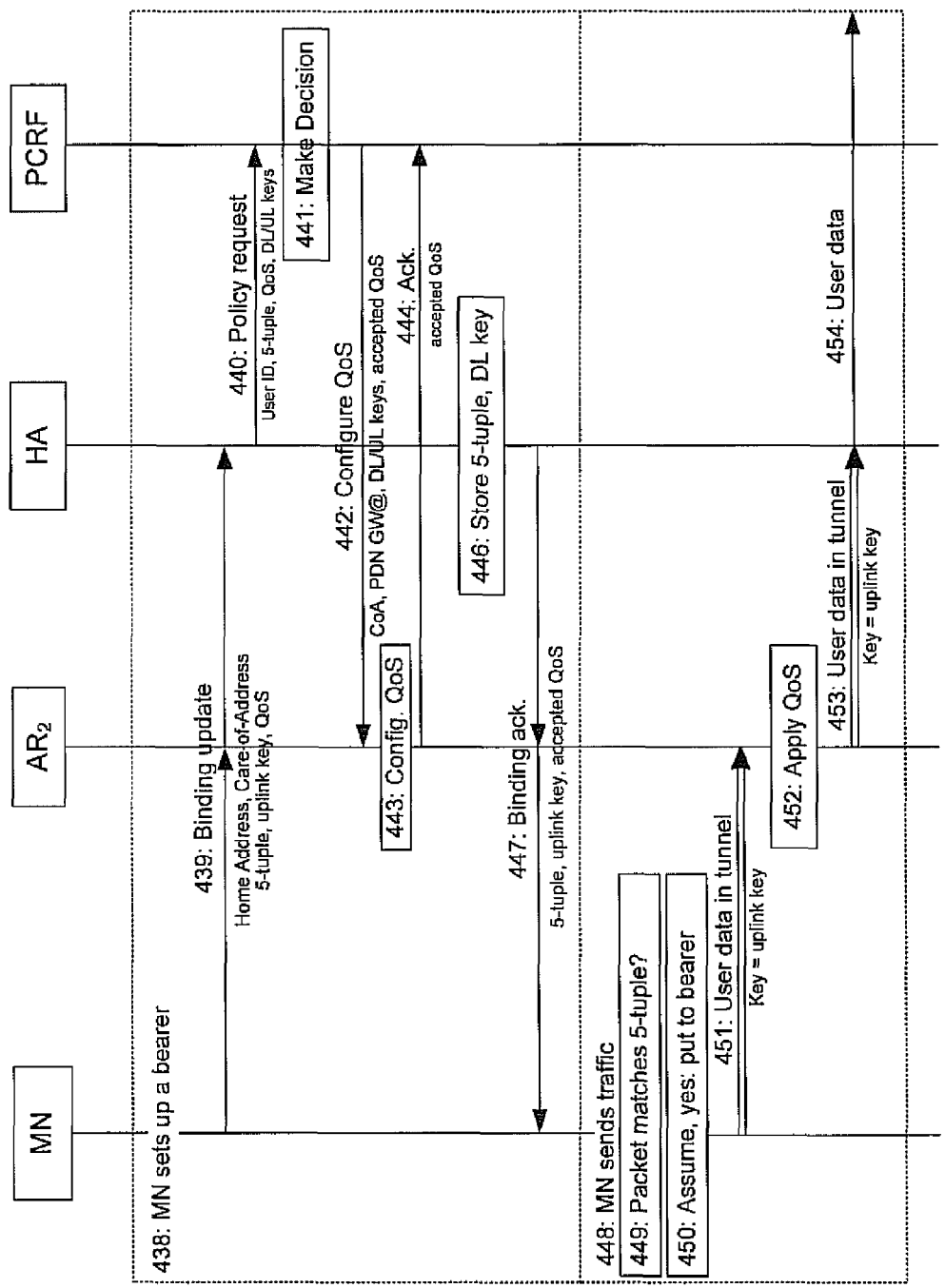
FIG. 10 shows a flow diagram according to another embodiment of the invention.
Figure 11:
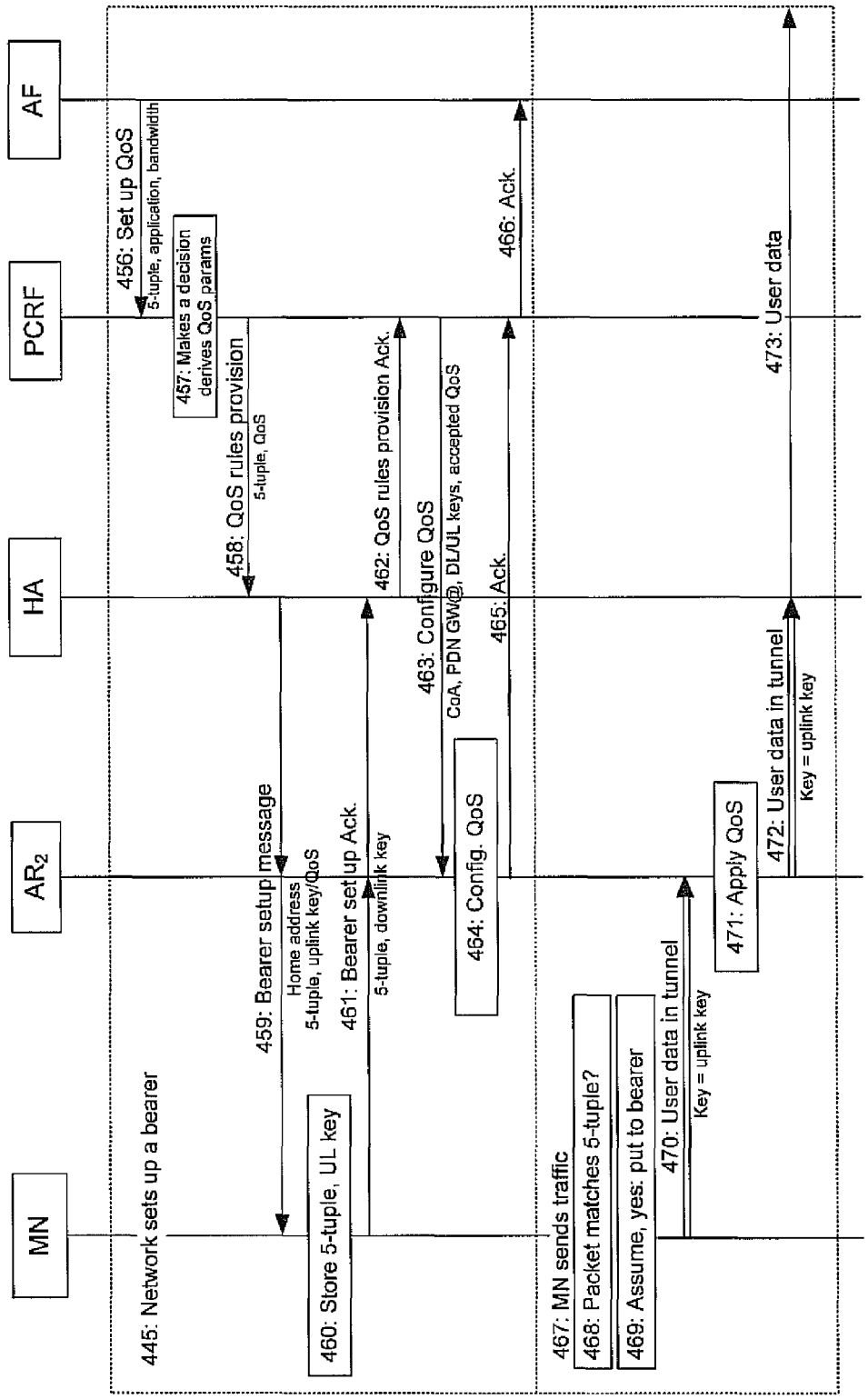
FIG. 11 shows a flow diagram according to yet another embodiment of the invention.

FIGS. 10 and 11 describe the signalling flow for the third arrangement mentioned earlier in the application, wherein it is assumed (for example) that the policy and charging control infrastructure is defined by 3GPP. This is now represented by a single node, the PCRF.

If the MN wishes to establish a new bearer, stage 438, is sends a Binding Update message to the HA is the same manner as the embodiments above, step 439. However, upon receipt of the Binding Update message, the HA notifies the PCRF, by sending a Policy Request in step 440. The PCRF then makes the policy decision, step 441. The PCRF determines whether the policy request is acceptable or not, and modifies the QoS descriptor if needed. Then, in steps 442 to 444 the PCRF sets up QoS in the middlebox (AR$_2$) explicitly. Then the middlebox (AR$_2$) can apply the QoS in step 452 easily. In this arrangement there is no need for the middlebox to snoop Binding Uplink messages, nor is there a need for a MIP proxy, as in the first and second arrangements.

FIG. 11 shows a flow diagram of the steps performed for QoS establishment when a network sets up a bearer, stage 445, for example from an Application Function node AF of FIG. 11, according to the Application Function defined in the 3GPP PCC architecture. In step 456 a Setup QoS message is sent from the AF to the PCRF. The PCRF then makes a policy decision and derives the QoS parameters. The PCRF then sends the QoS rules to the HA, step 458, which the HA can use when setting up a bearer with a MN, as shown in steps 459 to 461. Upon receipt of the QoS rules Acknowledgement in step 462, the PCRF can then configure the Qos of AR$_2$, steps 463 to 465. Thereafter, the access router AR$_2$ can apply the QoS in step 471 easily, without having to snoop the Binding Update messages.

The invention allows the delivery of QoS information to access networks coupled to the mobility signaling. This alleviates the need for the policy infrastructure to become mobility aware and to have signaling towards the access network. The invention has the advantage of combining the property of GTP with the host-based mobility management provided by Client MIP.

It is noted that a mobility session represents the state established in Mobile Nodes and Home Agents using the CMIP for the purpose of mobility management. The mobility session is established using the initial Binding Update messages and is terminated by a Binding Update that removes the cache entry for the Mobile Node from the Home agent. During the mobility session the Home Agent tracks the movement of the Mobile Node (via subsequent Binding Update messages) and forwards all traffic addressed to the Mobile Node to the current location of the Mobile Node (identified by the Care-of-Address).

It will be appreciated that the purpose of sub-sessions in the above mentioned embodiments is to allow different QoS treatment. It is noted, however, that the invention is not limited to this application, and that the sub-sessions can be used for other applications, for example providing different security treatment to sub-sessions within a mobility session.

It is noted that references to "adapted to perform" or "adapted to support" are intended to convey that an apparatus comprises technical means adapted to perform the required function, or to support the operation of the function being performed.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a host-based mobility managed telecommunications network adapted to process traffic using a mobile internet protocol (MIP) between a home agent node and a mobile node, the method comprising:
   providing one or more bearers for transporting data packets within a mobility session between the home agent node and the mobile node;
   associating a key value with each bearer, wherein the key value represents a quality of service (QoS) descriptor of a data packet being transported by the associated bearer, and the key value is contained in a tunnel header of each data packet based on a tunneling protocol;
   associating an outer IP header with each bearer, the outer IP header being used to route the associated data packet on a user plane, wherein the outer IP header and the tunnel header are different headers;
   using the one or more bearers to create sub-sessions within the mobility session;
   sending a binding request message from the mobile node to the home agent node, the binding request message comprising one or more downlink key values respectively associated with one or more bearers being requested by the mobile node;
   receiving a binding acknowledgement message from the home agent node at the mobile node, the binding acknowledgement message comprising one or more uplink key values respectively associated with the one or more bearers;
   wherein the one or more bearers enable sub-sessions to be created within the mobility session.

2. The method of claim 1 wherein first and second bearers of a plurality of bearers enable a first portion of traffic of a given mobile node to be distinguished from a second portion of traffic of that given mobile node.

3. The method of claim 1 and implemented in an access router node of the host-based mobility managed telecommunications network the method further comprising:
   configuring a QoS function for the one or more bearers; and
   applying the QoS function to packets passing through the access router node.

4. The method of claim 3 wherein configuring the QoS function comprises monitoring at least one of a binding update message and a binding acknowledgement message.

5. The method of claim 3 wherein configuring the QoS function comprises negotiating QoS provisions with a policy and charging rules function of the telecommunications network.

6. The method of claim 3:
wherein the access router comprises a proxy access router;
wherein the method further comprises learning one or more bearers by inspecting the messages being handled by the proxy access router.

7. A method in a host-based mobility managed telecommunications network adapted to process traffic using a mobile internet protocol (MIP) between a home agent node and a mobile node, the method comprising:
provide one or more bearers for transporting data packets within a mobility session between the home agent node and the mobile node;
associating a key value with each bearer, wherein the key value represents a quality of service (QoS) descriptor of a data packet being transported by the associated bearer, and the key value is contained in a tunnel header of each data packet based on a tunneling protocol;
associating an outer IP header with each bearer, the outer IP header being used to route the associated data packet on a user plane, wherein the outer IP header and the tunnel header are different headers;
using the one or more bearers to create sub-sessions within the mobility session;
sending a bearer setup message from the home agent node to the mobile node, the bearer setup message comprising one or more uplink key values respectively associated with the one or more bearers being requested by the home agent node; and
receiving a bearer setup acknowledgement message from the mobile node at the home agent node, the bearer setup acknowledgement message comprising one or more downlink key values respectively associated with the one or more bearers;
wherein the one or more bearers are configured to transport the data packets within the mobility session between the mobile node and the home agent node to enable sub-sessions to be created within the mobility session.

8. A method in a host-based mobility managed telecommunications network adapted to process traffic using a mobile internet protocol (MIP) between a home agent node and a mobile node, the method comprising:
providing one or more bearers for transporting data packets within a mobility session between the home agent node and the mobile node;
associating a key value with each bearer, wherein the key value represents a quality of service (QoS) descriptor of a data packet being transported by the associated bearer, and the key value is contained in a tunnel header of each data packet based on a tunneling protocol;
associating an outer IP header with each bearer, the outer IP header being used to route the associated data packet on a user plane, wherein the outer IP header and the tunnel header are different headers;
using the one or more bearers to create sub-sessions within the mobility session;
receiving a binding request message from the mobile node at the home agent node, the binding request message comprising one or more downlink key values respectively associated with one or more bearers being requested by the mobile node; and
sending a binding acknowledgement message from the home agent node to the mobile node, the binding acknowledgement message comprising one or more uplink key values respectively associated with the one or more bearers;
wherein the one or more bearers are configured to transport the data packets within the mobility session between the mobile node and the home agent node to enable sub-sessions to be created within the mobility session.

9. A host-based mobility managed telecommunications network comprising:
an apparatus adapted to support mobile internet protocol by:
providing one or more bearers for transporting data packets within a mobility session between a home agent node and a mobile node;
associating a key value with each bearer, wherein the key value represents a quality of service (QoS) descriptor of a data packet being transported by the associated bearer, and the key value is contained in a tunnel header of each data packet based on a tunneling protocol;
associating an outer IP header with each bearer, the outer IP header being used to route the associated data packet on a user plane, wherein the outer IP header and the tunnel header are different headers;
using the one or more bearers to create sub-sessions within the mobility session; and the mobile node configured to support mobile internet protocol (MIP) by:
sending a binding request message from the mobile node to the home agent node, the binding request message comprising one or more downlink key values respectively associated with one or more bearers being requested by the mobile node;
receiving a binding acknowledgement message from the home agent node at the mobile node, the binding acknowledgement message comprising one or more uplink key values respectively associated with the one or more bearers;
wherein the one or more bearers enable sub-sessions to be created within the mobility session.

10. A host-based mobility managed telecommunications network comprising:
an apparatus adapted to support mobile internet protocol by:
providing one or more bearers for transporting data packets within a mobility session between a home agent node and a mobile node;
associating a key value with each bearer, wherein the key value represents a quality of service (QoS) descriptor of a data packet being transported by the associated bearer, and the key value is contained in a tunnel header of each data packet based on a tunneling protocol;
associating an outer IP header with each bearer, the outer IP header being used to route the associated data packet on a user plane, wherein the outer IP header and the tunnel header are different headers;
using the one or more bearers to create sub-sessions within the mobility session; and the home agent node configured to support mobile internet protocol (MIP) by:
sending a bearer setup message to the mobile node, the bearer setup message comprising one or more uplink key values respectively associated with the one or more bearers being requested by the home agent node; and
receiving a bearer setup acknowledgement message from the mobile node, the bearer setup acknowledgement message comprising one or more downlink key values respectively associated with the one or more bearers;
wherein the one or more bearers are configured to transport the data packets within the mobility session between the mobile node and the home agent node to enable sub-sessions to be created within the mobility session.

11. A host-based mobility managed telecommunications network comprising:
an apparatus adapted to support mobile internet protocol by:
providing one or more bearers for transporting data packets within a mobility session between a home agent node and a mobile node;
associating a key value with each bearer, wherein the key value represents a quality of service (QoS) descriptor of a data packet being transported by the associated bearer, and the key value is contained in a tunnel header of each data packet based on a tunneling protocol;
associating an outer IP header with each bearer, the outer IP header being used to route the associated data packet on a user plane, wherein the outer IP header and the tunnel header are different headers;
using the one or more bearers to create sub-sessions within the mobility session; and the home agent node configured to support mobile internet protocol (MIP) by:
receiving a binding request message from the mobile node, the binding request message comprising one or more downlink key values respectively associated with one or more bearers being requested by the mobile node; and
sending a binding acknowledgement message to the mobile node, the binding acknowledgement message comprising one or more uplink key values respectively associated with the one or more bearers;
wherein the one or more bearers are configured to transport the data packets within the mobility session between the mobile node and the home agent node to enable sub-sessions to be created within the mobility session.

* * * * *

UNITED STATES PATENT AND TRADEMARK OFFICE
CERTIFICATE OF CORRECTION

PATENT NO. : 9,100,983 B2  
APPLICATION NO. : 13/512256  
DATED : August 4, 2015  
INVENTOR(S) : Turányi et al.

Page 1 of 1

It is certified that error appears in the above-identified patent and that said Letters Patent is hereby corrected as shown below:

In the specification

In Column 3, Line 44, delete "$SDF_2N$." and insert -- $SDF_{2N}$. --, therefor.

In Column 4, Line 43, delete "bearer" and insert -- bearer. --, therefor.

In Column 7, Line 64, delete "appreaciated" and insert -- appreciated --, therefor.

In Column 10, Lines 58-59, delete "middelbox" and insert -- middlebox --, therefor.

Signed and Sealed this
Third Day of May, 2016

Michelle K. Lee
*Director of the United States Patent and Trademark Office*